United States Patent
Kwok et al.

(10) Patent No.: US 12,504,912 B2
(45) Date of Patent: Dec. 23, 2025

(54) SOFT READ FOR NVM THAT IS SUBJECT TO DESTRUCTIVE READS

(71) Applicant: Intel Corporation, Santa Clara, CA (US)

(72) Inventors: Zion Kwok, Burnaby (CA); Santhosh Vanaparthy, Santa Clara, CA (US); Ravi Motwani, Fremont, CA (US); Poovaiah Manavattira Palangappa, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 17/678,865

(22) Filed: Feb. 23, 2022

(65) Prior Publication Data

US 2022/0179582 A1    Jun. 9, 2022

(51) Int. Cl.
    *G06F 3/06*    (2006.01)

(52) U.S. Cl.
    CPC .......... *G06F 3/0655* (2013.01); *G06F 3/0604* (2013.01); *G06F 3/0679* (2013.01)

(58) Field of Classification Search
    CPC ... G06F 3/0679; G06F 3/0619; G06F 11/1048
    See application file for complete search history.

(56) References Cited

U.S. PATENT DOCUMENTS

| | | | |
|---|---|---|---|
| 10,839,916 B2 | 11/2020 | Kwok et al. | |
| 10,944,424 B1* | 3/2021 | Wang | H04L 1/005 |
| 2006/0008255 A1* | 1/2006 | Yen | G11B 20/10009 |
| 2015/0095736 A1 | 4/2015 | Leem et al. | |
| 2016/0049203 A1* | 2/2016 | Alrod | G06F 11/073 714/2 |

* cited by examiner

*Primary Examiner* — Nicholas A. Paperno
(74) *Attorney, Agent, or Firm* — Essential Patents Group, LLP (57) ABSTRACT

Techniques and mechanisms for supporting error correction of data accessed in a non-volatile (NVM) memory. In an embodiment, a memory controller performs reads each of the same codeword from the NVM, wherein a first read is based on a first reference voltage, and a second read is based on a second reference voltage. Based on the first read and the second read, confidence values are assigned each to respective bits of the codeword. Error correction comprises applying a weights to respective bits of the codeword based on the confidence values. In other embodiments, a relatively low confidence value is assigned to codeword bits that have a different value for the first read and the second read.

14 Claims, 8 Drawing Sheets

SOFT READ FOR NVM THAT IS SUBJECT TO DESTRUCTIVE READS

BACKGROUND

Error-correcting code (ECC) memory is a type of computer data storage that detects and corrects many types of internal data corruption. Typically, an ECC memory maintains a memory system immune to one or multiple bits of errors. In ECC memory the data that is read from each word is the same as the data that had been written to it, even if one or more of the bits actually stored in the ECC memory has been flipped to the wrong state.

ECC memory is used to provide reliability for applications that cannot tolerate data corruption. ECC memory may be comprised of an extra device on a dual in-line memory module (DIMM) which provides the additional ECC storage, as well as data lane so that ECC information is written and read along with the data. For example, on a DIMM with ×8 devices, an ECC DIMM may be comprised of 9 such devices to form a 72 bit channel, where 64 bits are used to transfer the data and 8 bits are used for ECC data transfer. Data may be protected with Single Error Correction and Double Error Detection (SECDED) with 8 bits for every 64 bits of data transfer.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. NV memory (NVM) may be a storage medium that does not require power to maintain the state of data stored by the medium. In one embodiment, the memory component may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

Figure 1:
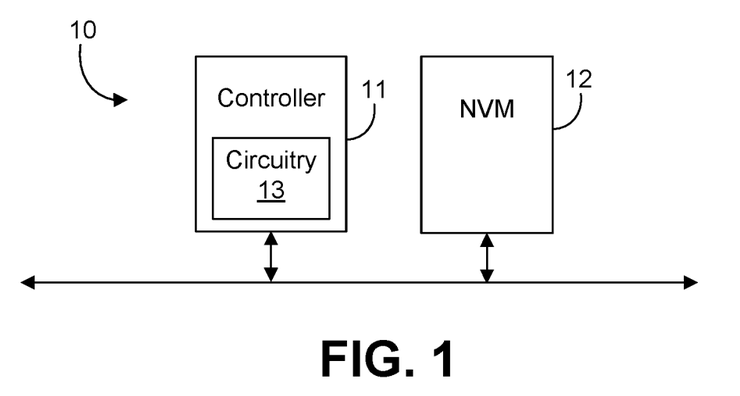
FIG. 1 is a block diagram of an example of an electronic system according to an embodiment.

With reference to FIG. 1, an embodiment of an electronic system 10 may include a controller 11 communicatively coupled to NVM 12. The NVM 12 may have a destructive read characteristic and memory cells programmed to a high resistance state that corresponds to a first threshold voltage and a low resistance state that correspond to a second threshold voltage (e.g., such as memory cells of 3D crosspoint memory, etc.). The controller 11 may include circuitry 13 to perform a first read of a codeword from the NVM 12 at a first reference voltage of a low confidence zone, where the low confidence zone is between the first and second threshold voltages, perform a second read of the codeword from the NVM 12 at a second reference voltage of the low confidence zone, where the second threshold voltage is different from the first reference voltage, and assign a lower confidence value to bits of the codeword that have a different value for the first read of the codeword and the second read of the codeword as compared to a confidence value assigned to bits of the codeword that have a same value for the first read of the codeword and the second read of the codeword. In some embodiments, the circuitry 13 may also be configured to correct an error in the codeword based on the confidence values assigned to the bits of the codeword.

In some embodiments, the circuitry 13 may be further configured to determine a preferred reference voltage for the first reference voltage of the low confidence zone, and determine a lower reference voltage relative to the preferred reference voltage for the second reference voltage of the low confidence zone. For example, the circuitry 13 may be configured to apply weights in an error code correction decoder based on the confidence values assigned to the bits of the codeword, and/or to apply more weight to bits of the codeword that correspond to the first, preferred reference voltage relative to bits of the codeword that correspond to the second, lower reference voltage. Alternatively, or additionally, the circuitry 13 may be configured to assign a log-likelihood ratio (LLR) to the bits of the codeword based on the confidence values assigned to the bits of the codeword. For example, the circuitry 13 may be configured to assign a LLR of zero to the bits of the codeword assigned the lower confidence values (e.g., effectively erasing those bits for some error decode techniques).

Embodiments of the controller 11 may include a general purpose controller, a special purpose controller, a memory controller, a storage controller, a micro-controller, an execution unit, etc. In some embodiments, the NVM 12, the circuitry 13, and/or other system memory may be located in, or co-located with, various components, including the controller 11 (e.g., on a same die or package substrate). For example, the controller 11 may be configured as a storage controller and the NVM 12 may be a connected storage device such as NV dual-inline memory module (NVDIMM), a solid-state drive (SSD), a storage node, etc. Embodiments of each of the above controller 11, NVM 12, circuitry 13, and other system components may be implemented in hardware, software, or any suitable combination thereof. For example, hardware implementations may include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the NVM 12, other persistent storage media, or other system memory may store a set of instructions (e.g., which may be firmware instructions) which when executed by the controller 11 cause the system 10 to implement one or more components, features, or aspects of the system 10 (e.g., controlling access to the NVM 12, performing the first read of a codeword from the NVM 12 at the first reference voltage, performing the second read of the codeword from the NVM 12 at the second reference voltage, assigning the lower confidence value to bits of the codeword that have a different value for the first read of the codeword and the second read of the codeword, etc.).

Figure 2:
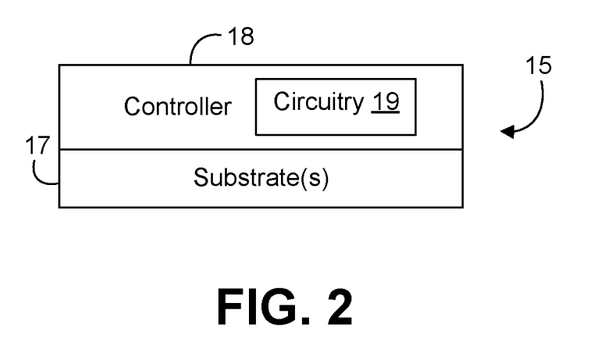
FIG. 2 is a block diagram of an example of an electronic apparatus according to an embodiment.

With reference to FIG. 2, an embodiment of an electronic apparatus 15 may include one or more substrates 17, and a controller 18 coupled to the one or more substrates 17. The controller 18 may include circuitry 19 to control access to a NVM with a destructive read characteristic and memory cells programmed to a high resistance state that corresponds to a first threshold voltage and a low resistance state that correspond to a second threshold voltage, perform a first read of a codeword from the NVM at a first reference voltage of a low confidence zone, where the low confidence zone is between the first and second threshold voltages, perform a second read of the codeword from the NVM at a second reference voltage of the low confidence zone, where the second threshold voltage is different from the first reference voltage, and assign a lower confidence value to bits of the codeword that have a different value for the first read of the codeword and the second read of the codeword as compared to a confidence value assigned to bits of the codeword that have a same value for the first read of the codeword and the second read of the codeword. In some embodiments, the circuitry 19 may also be configured to correct an error in the codeword based on the confidence values assigned to the bits of the codeword.

In some embodiments, the circuitry 19 may be further configured to determine a preferred reference voltage for the first reference voltage of the low confidence zone, and determine a lower reference voltage relative to the preferred reference voltage for the second reference voltage of the low confidence zone. For example, the circuitry 19 may be configured to apply weights in an error code correction decoder based on the confidence values assigned to the bits of the codeword, and/or to apply more weight to bits of the codeword that correspond to the first, preferred reference voltage relative to bits of the codeword that correspond to the second, lower reference voltage. Alternatively, or additionally, the circuitry 19 may be configured to assign a LLR to the bits of the codeword based on the confidence values assigned to the bits of the codeword. For example, the circuitry 19 may be configured to assign a LLR of zero to the bits of the codeword assigned the lower confidence values.

For example, the controller 18 may be configured as a storage controller. For example, the NVM may be a connected storage device (e.g., NVDIMM, a SSD, a storage node, etc.). Embodiments of the circuitry 19 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry 19 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 19 may be implemented on a semiconductor apparatus, which may include the one or more substrates 17, with the circuitry 19 coupled to the one or more substrates 17. In some embodiments, the circuitry 19 may be at least partly implemented in one or more of configurable logic and fixed-functionality hardware logic on semiconductor substrate(s) (e.g., silicon, sapphire, gallium-arsenide, etc.). For example, the circuitry 19 may include a transistor array and/or other integrated circuit components coupled to the substrate(s) 17 with transistor channel regions that are positioned within the substrate(s) 17. The interface between the circuitry 19 and the substrate(s) 17 may not be an abrupt junction. The circuitry 19 may also be considered to include an epitaxial layer that is grown on an initial wafer of the substrate(s) 17.

Figure 3A:
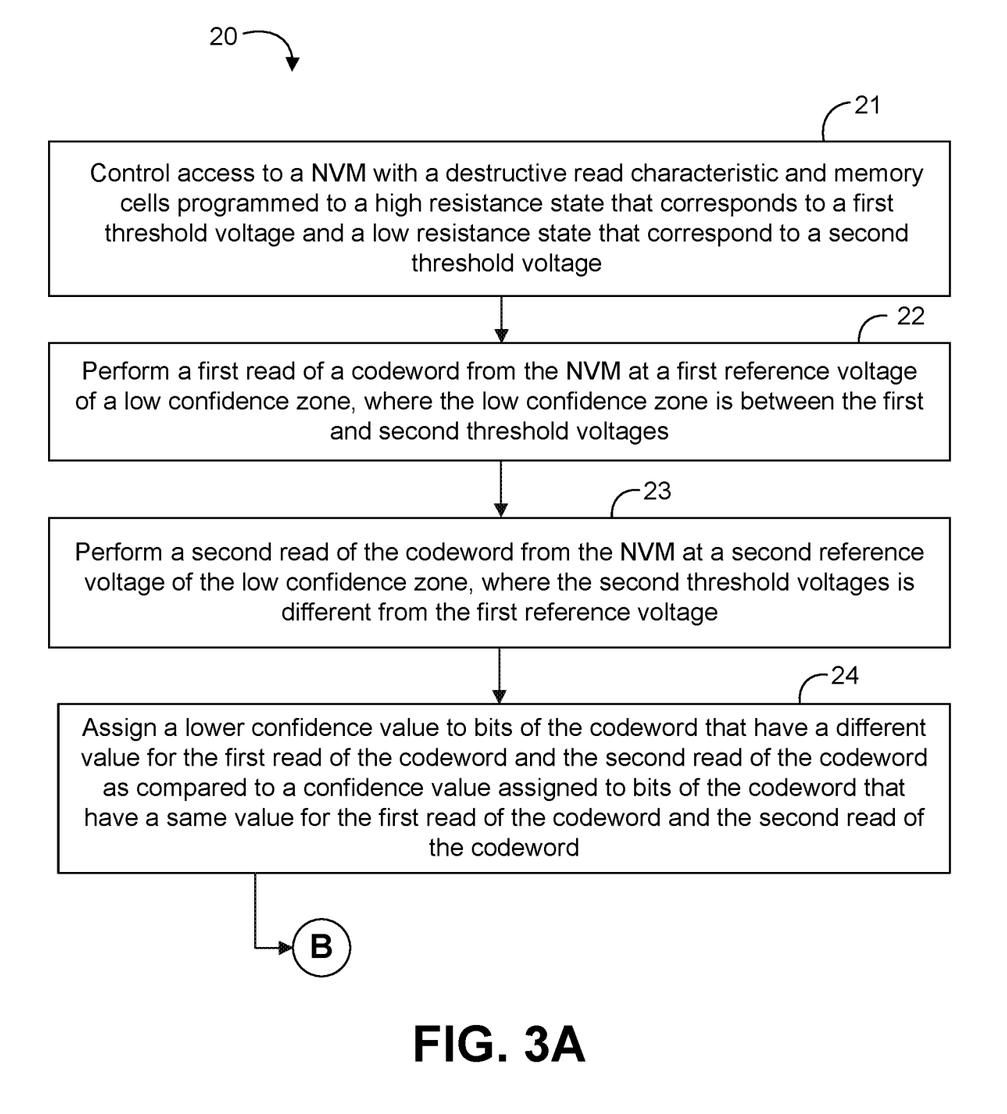
FIGS. 3A to 3B is a flowchart of an example of a method according to an embodiment.
Figure 3B:
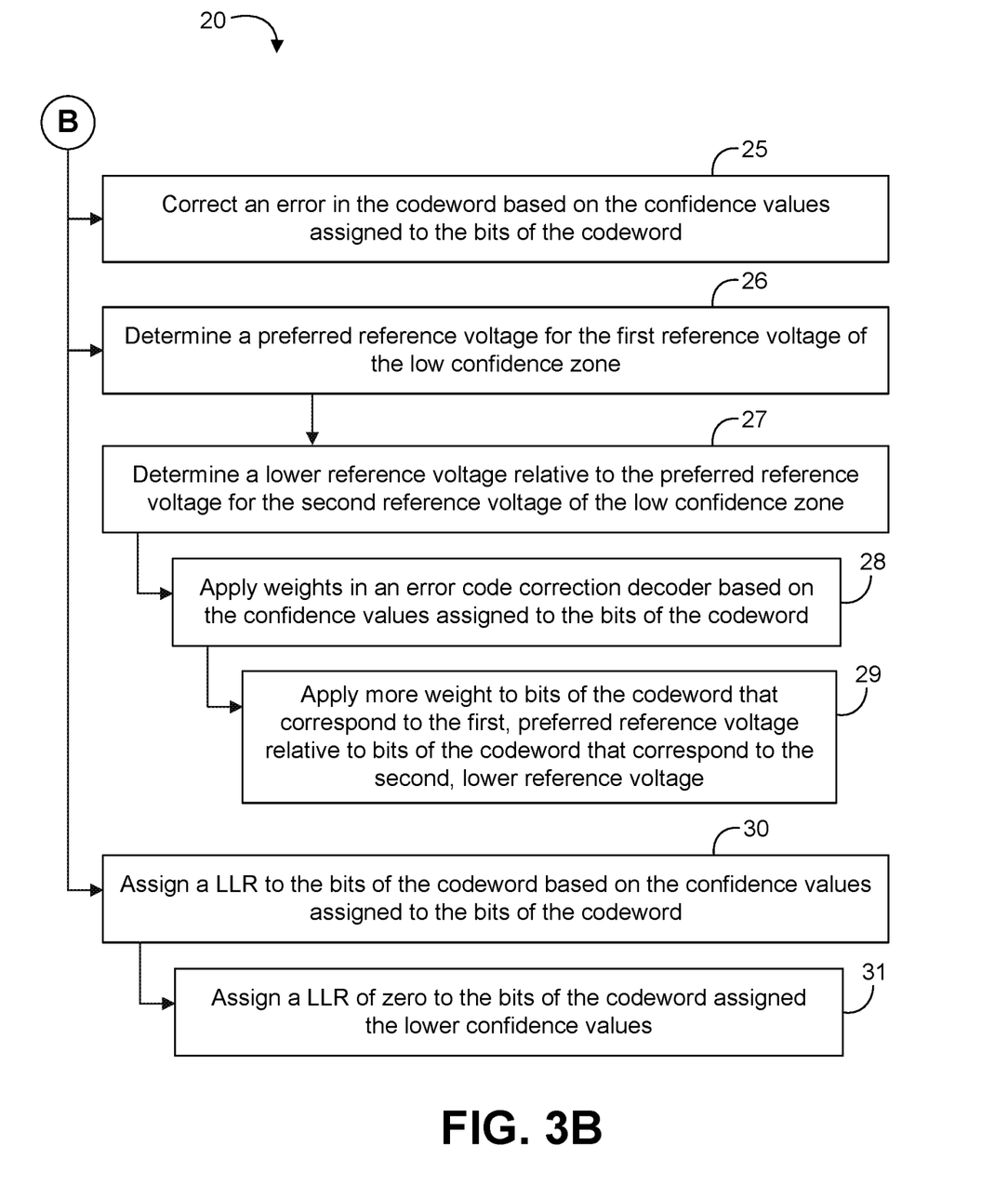

Turning now to FIGS. 3A to 3B, an embodiment of a method 20 may include controlling access to a NVM with a destructive read characteristic and memory cells programmed to a high resistance state that corresponds to a first threshold voltage and a low resistance state that correspond to a second threshold voltage at block 21, performing a first read of a codeword from the NVM at a first reference voltage of a low confidence zone, where the low confidence zone is between the first and second threshold voltages at block 22, performing a second read of the codeword from the NVM at a second reference voltage of the low confidence zone, where the second threshold voltage is different from the first reference voltage at block 23, and assigning a lower confidence value to bits of the codeword that have a different value for the first read of the codeword and the second read of the codeword as compared to a confidence value assigned to bits of the codeword that have a same value for the first read of the codeword and the second read of the codeword at block 24. Some embodiments of the method 20 further include correcting an error in the codeword based on the confidence values assigned to the bits of the codeword at block 25.

In some embodiments, the method 20 may further include determining a preferred reference voltage for the first reference voltage of the low confidence zone at block 26, and determining a lower reference voltage relative to the preferred reference voltage for the second reference voltage of the low confidence zone at block 27. For example, the method 20 may include applying weights in an error code correction decoder based on the confidence values assigned to the bits of the codeword at block 28, and/or applying more weight to bits of the codeword that correspond to the first, preferred reference voltage relative to bits of the codeword that correspond to the second, lower reference voltage at block 29. Alternatively, or additionally, the method 20 may include assigning a LLR to the bits of the codeword based on the confidence values assigned to the bits of the codeword at block 30. For example, the method 20 may include assigning a LLR of zero to the bits of the codeword assigned the lower confidence values at block 31.

Embodiments of the method 20 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide technology for soft reads for 3D crosspoint memory. A 3D crosspoint memory may have a minority of bits that are bit errors. When there are too many bit errors, costs are increased because of additional memory to store additional error correction code (ECC) parity bits so that an ECC decoder can correct errors with a sufficiently low failure rate. A memory system may utilize a particular type of ECC that corrects the most errors for that memory system. Non-limiting examples of different types of ECC technology include Bose, Chaudhuri, and Hocquenghem (BCH) codes, Reed-Solomon codes, and low-density parity-check (LDPC) codes. In general, increasing a codeword size may correct a higher percentage of errors with the same percentage of parity bits. For some read errors, re-reading from the memory with a different read reference voltage (e.g. or demarcation voltage (VDM)) may resolve the error. One problem with the foregoing techniques is that increasing the codeword size requires the codeword access granularity to be bigger. The bigger granularity may create a performance bottleneck in a random-access scenario. Another problem for some memory technology (e.g., 3D crosspoint, etc.) is that re-reads may cause a potential stall in the system, that can cause a quality-of-service (QoS) bottleneck. Some embodiments may overcome one or more of the foregoing problems.

Some embodiments may support ECC with a sufficiently low failure rate and better correction strength. In particular, some embodiments may enable an ECC decoder to correct more errors with the same number of ECC parity bits (e.g., or, alternatively, the ECC decoder may correct the same number of errors with fewer ECC parity bits). Advantageously, embodiments of a 3D crosspoint memory system may be more reliable and tolerant to failures without an increase in cost (e.g., or, alternatively, embodiments may be just as reliable and tolerant to failures with a reduction in cost).

In some embodiments, the same codeword is read from memory using multiple VDMs and the bits that change between the different reads may be erased or assigned a lower confidence. The erased bits and/or lower confidence information may be used by an ECC decoder (e.g., a BCH decoder, a Reed-Solomon decoder, a LDPC decoder, etc.) to correct more errors. Specifically, in some embodiments, different weightings of the multiple reads may be applied internally in the ECC decoder in attempts to correct the codeword. Advantageously, some embodiments may reduce the number of ECC parity bits required to correct the same number of bit errors, which allows cost reduction and higher error correction rates in 3D crosspoint memory (e.g., as compared to lithography scaling). Alternatively, some embodiments may advantageously allow more metadata and/or data integrity bits.

Figure 4:
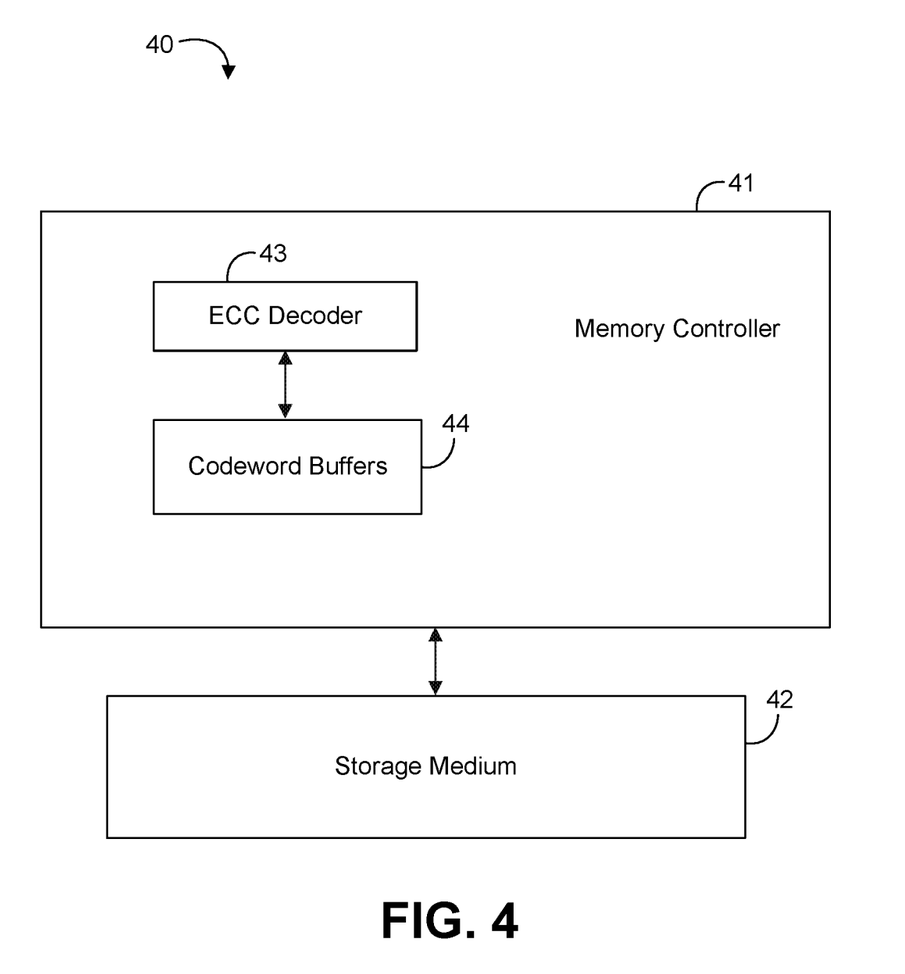
FIG. 4 is a block diagram of an example of a memory system according to an embodiment.

With reference to FIG. 4, an embodiment of a memory system 40 includes a memory controller 41 coupled to a storage medium 42 (e.g., 3D crosspoint memory, a SSD, etc.). The memory controller 41 includes an ECC decoder 43 coupled to codeword buffers 44. In some embodiments, one or more of the codeword buffers 44 may be utilized to combine codewords from two different reads. The additional buffer(s) may be connected via a data path to other codeword buffers where codewords can be combined. The additional buffer(s) may also be connected to the ECC decoder. In an example operation, the memory controller 41 is configured to obtain a codeword from the storage medium 42 at a first VDM, to request the same codeword from the storage medium 42 at another VDM, and to buffer the codewords and mix the codewords as needed in the codewords buffers 44. The various codewords are input into the ECC decoder 43 from the codeword buffers 44. If the decode is not successful, the ECC decoder 43 applies the configured decode technique, utilizing the codewords buffers 44 as needed, until the decode is successful (e.g., or indicating an error condition in accordance with the configured decode technique).

In some systems, 3D crosspoint memory cells may be programmed to a high resistance state (RESET=0) and a low resistance state (SET=1). The cells in the RESET state require a higher read reference voltage or demarcation voltage (VDM) to enable current to flow through the cell. During a read, a preferred VDM that is in between the threshold voltages of a population of SET cells and a population of RESET cells is chosen and applied across the cell. Current or voltage sensors determine whether the cell "snaps" and current flows or not. If the cell snaps, the cell is read as a SET or logical 1. Otherwise, the cell is read as a RESET or logical 0.

Figure 5:
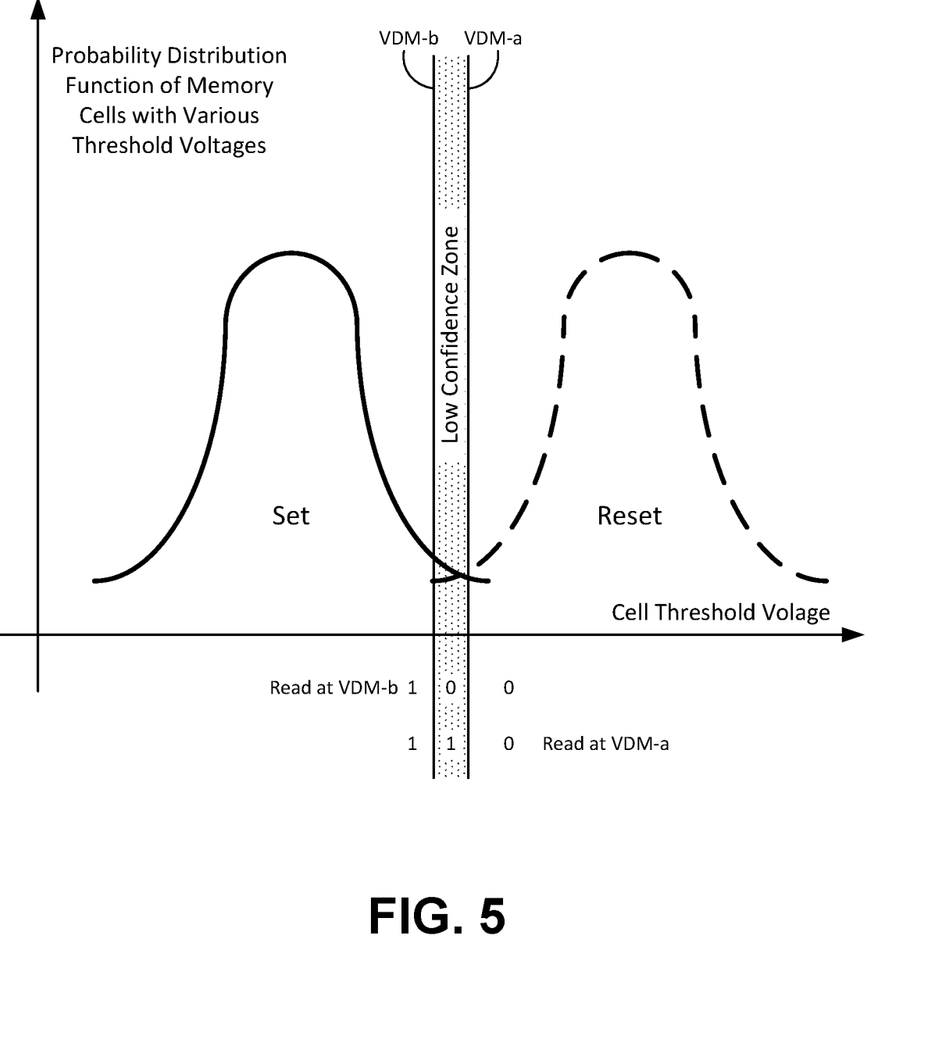
FIG. 5 is an illustrative graph of an example of a probability distribution for a memory cell at various threshold voltages according to an embodiment.

With reference to FIG. 5, an illustrative graph shows a probability distribution function of 3D crosspoint memory cells with various threshold voltages. FIG. 5 further shows how an embodiment of a controller may read the same 3D crosspoint cells at multiple VDMs, namely VDM-a and VDM-b. 3D crosspoint memory technology may be subject to destructive reads. For example, 3D crosspoint memory cells that are read with a VDM higher than the cell's threshold voltage when it snaps or conducts current will experience a physical disturbance that modifies the cell's resistance and reduces the threshold voltage, effectively setting the memory cell. Such changing of the value of the cell during a read may be considered a destructive read characteristic. Some embodiments may limit the number of reads of a memory cell (e.g., preferably only two reads) and may perform the additional soft read(s) at a safer VMD relative to the chosen, preferred VDM. For 3D crosspoint memory, for example, a lower VMD than the chosen VDM may be considered a safer VMD to avoid a potentially destructive read of the memory cell. Advantageously, embodiments may be better suited error correction technology for memory that has a destructive read characteristic.

FIG. 5 shows a low confidence zone with a preferred, chosen reference voltage of VMD-a, and a lower reference voltage of VDM-b. As shown in FIG. 5, there are some cells that will read as 0 at VDM-a and as 1 at VDM-b. Some embodiments treat all cells that have this behavior of changing the cell's value between multiple reads in the low confidence zone as "low confidence" bits. If there are error bits detected in the codeword, the identified low-confidence bits are more likely to be in error in comparison to the other bits in the codeword. Tables 1 and 2 below show non-limiting examples of confidence values associated with different read behaviors in the low confidence zone.

TABLE 1

| Bit behavior | Confidence Rating | Confidence Value |
|---|---|---|
| Unchanged for both reads at VDM-a and VDM-b | High | 1 |
| Changed between reads at VDM-a and VDM-b | Low | 0 |

TABLE 2

| Bit behavior | Confidence Rating | Confidence Value |
|---|---|---|
| Zero for both reads at VDM-a and VDM-b | High | 3 |
| One for both reads at VDM-a and VDM-b | High | 2 |
| Changed from one at VDM-a to zero VDM-b | Low | 1 |
| Changed from zero at VDM-a to one at VDM-b | Low | 0 |

Advantageously, identification of the low confidence bits may greatly help the effort to identify and correct the bit errors in a codeword for a wide variety of error correction techniques. Non-limiting examples of different types of ECC techniques that may beneficially apply embodiments of the identified low confidence include error correction based on LDPC codes, BCH codes, and Reed-Solomon codes (e.g., although the different techniques may utilize the low confidence information differently).

LDPC Examples

With LDPC, a log-likelihood ratio (LLR) of 0 may be assigned to the bits identified as low confidence bits. Assigning a LLR of zero to a bit effectively erases the bit. Alternatively, some implementations may give more weight to the more optimal VDM, and give the low confidence bits a lower LLR magnitude with the sign based on the result of the read with the more optimal VDM. Some implementation may also retry LDPC decoding with multiple LLR assignments for the low confidence zone, as well as for the rest of the codeword bits.

BCH Examples

With BCH, the identified low confidence bits may be treated as erased locations. Two example implementations may utilize erased locations to improve decoding. One implementation may try two decodes, where the erased bits are set to all 0s or all 1s. A second implementation may utilize chase decoding to try combinations of values for the erased bits to improve the probability of correction.

Reed-Solomon Examples

With Reed-Solomon, the identified low confidence bits may be treated as erased bits. Symbols with erased bits may then be erased in errors and erasures decoding.

Advantageously, an ECC decoder that utilizes embodiments of a soft read techniques as described herein may exhibit a substantial improvement in raw bit error rate (RBER) as compared to hard reads alone (e.g., a hard-decision decode).

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 6:
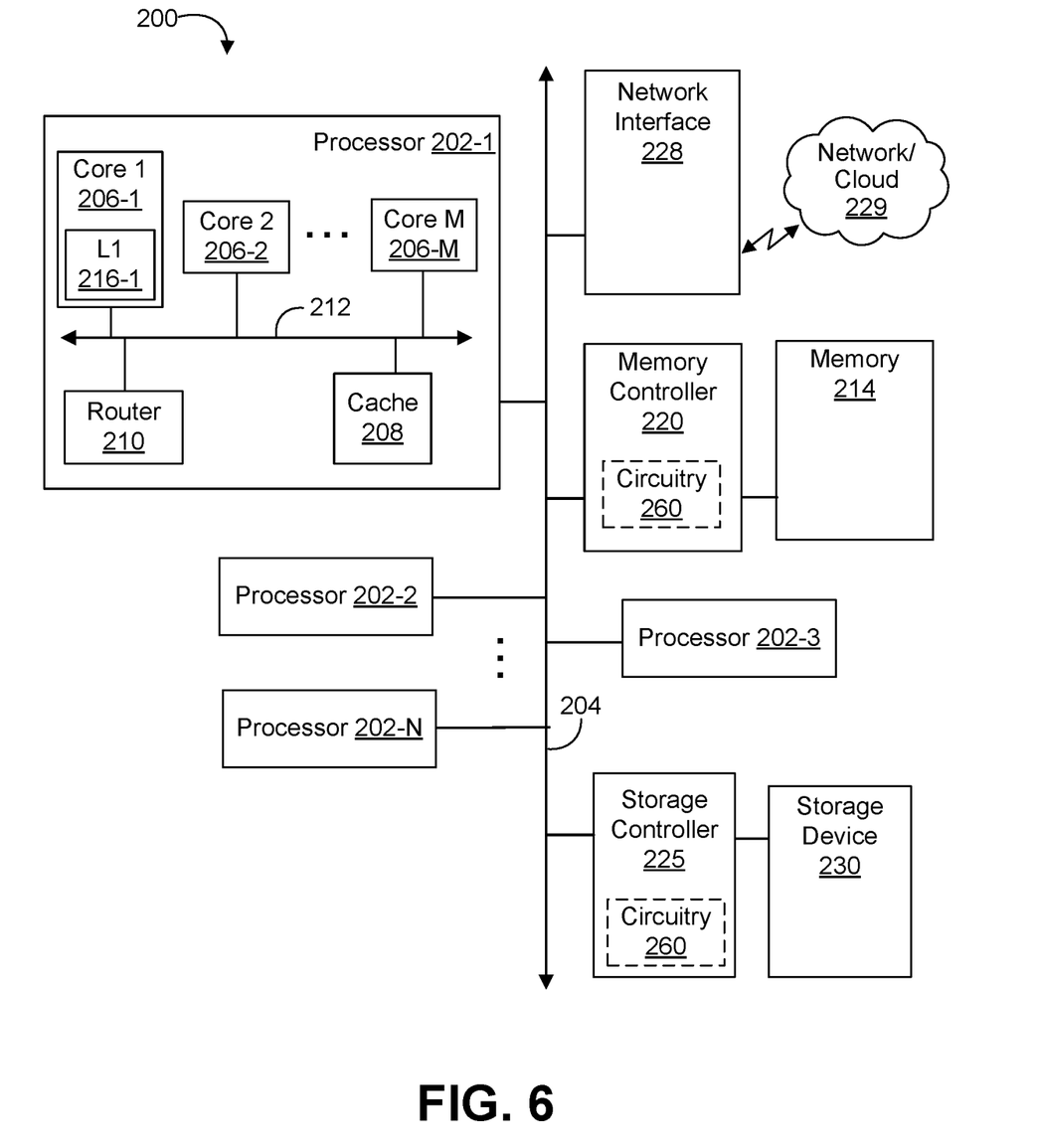
FIG. 6 is a block diagram of an example of a computing system according to an embodiment.

Turning now to FIG. 6, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 6, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 6, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 6, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, etc., to sense variations in various factors affecting power/thermal behavior of the system/platform, such as temperature, operating frequency, operating voltage, power consumption, and/or inter-core communication activity, etc.

As shown in FIG. 6, features or aspects of the circuitry 260 may be distributed throughout the system 200, and/or co-located/integrated with various components of the system 200. Any aspect of the system 200 that may require or benefit from error correction technology and/or soft read technology may include the circuitry 260. For example, the memory 214, the memory controller 220, the storage controller 225, and the network interface 228 may each include circuitry 260, which may be in the same enclosure as the system 200 and/or fully integrated on a printed circuit board (PCB) of the system 200. For example, the circuitry 260 may be configured to implement the error correction technology and/or soft read technology aspects of the various embodiments. For example, the respective circuitry 260 may be configured to provide error correction technology and/or soft read technology for the memory 214 and/or the storage device 230.

Advantageously, the circuitry 260 may include technology to implement one or more aspects of the system 10 (FIG. 1), the apparatus 15 (FIG. 2), the method 20 (FIGS. 3A to 3B), the low confidence zones (e.g., see FIG. 5), and/or any of the error correction and/or soft read features discussed herein. The system 200 may include further circuitry 260 and located outside of the foregoing components.

In some embodiments, the memory 214 may be 3D crosspoint memory (e.g., INTEL OPTANE). The circuitry 260 may be configured to perform a first read of a codeword from the memory 214 at a first reference voltage of a low confidence zone, where the low confidence zone is between the first and second threshold voltages, perform a second read of the codeword from the memory 214 at a second reference voltage of the low confidence zone, where the second threshold voltage is different from the first reference voltage, and assign a lower confidence value to bits of the codeword that have a different value for the first read of the codeword and the second read of the codeword as compared to a confidence value assigned to bits of the codeword that have a same value for the first read of the codeword and the second read of the codeword. In some embodiments, the circuitry 260 may also be configured to correct an error in the codeword based on the confidence values assigned to the bits of the codeword.

In some embodiments, the circuitry 260 may be further configured to determine a preferred reference voltage for the first reference voltage of the low confidence zone, and determine a lower reference voltage relative to the preferred reference voltage for the second reference voltage of the low confidence zone. For example, the circuitry 260 may be configured to apply weights in an error code correction decoder based on the confidence values assigned to the bits of the codeword, and/or to apply more weight to bits of the codeword that correspond to the first, preferred reference voltage relative to bits of the codeword that correspond to the second, lower reference voltage. Alternatively, or additionally, the circuitry 260 may be configured to assign a LLR to the bits of the codeword based on the confidence values assigned to the bits of the codeword. For example, the circuitry 260 may be configured to assign a LLR of zero to the bits of the codeword assigned the lower confidence values (e.g., effectively erasing those bits for some error decode techniques).

Figure 7:
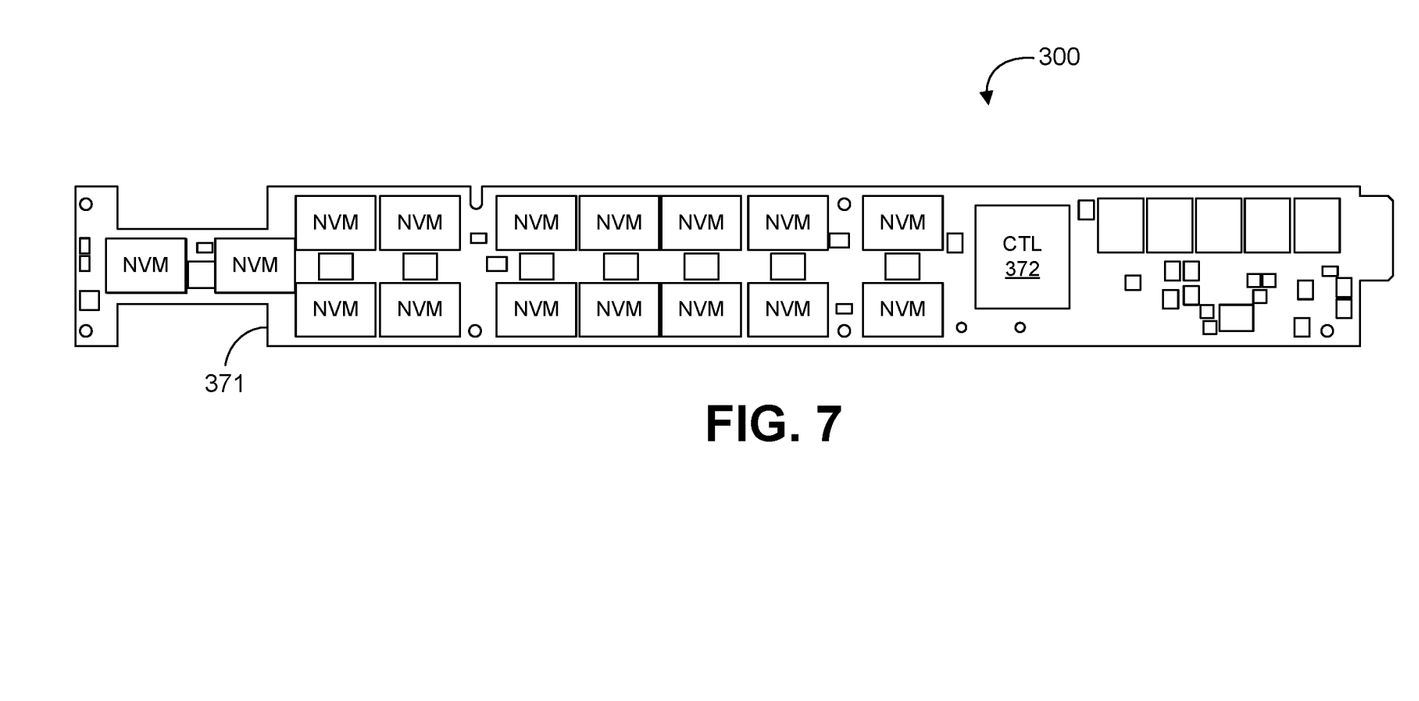
FIG. 7 is an illustrative top view of another example of a SSD according to an embodiment.

With reference to FIG. 7, an embodiment of a SSD 300 includes a PCB 371 with an E1.L standard form factor. The SSD 300 may be configured for performance clustered, bandwidth-optimized storage. FIG. 7 shows only one side of the SSD 300, with 16 packages of NVM ICs per side for a total of 32 NVM devices. The SSD 300 further includes a controller 372 with embodiments of technology for increased memory failure handling as described herein. For example, the 32 NVM devices may include 3D crosspoint memory (e.g., INTEL OPTANE). The controller 372 may be configured to implement one or more aspects of the controller 11 (FIG. 1), the controller 18 (FIG. 2), the method 20 (FIGS. 3A to 3B), the low confidence zones (e.g., see FIG. 5), and/or any of the error correction and/or soft read features discussed herein.

Figure 8A:
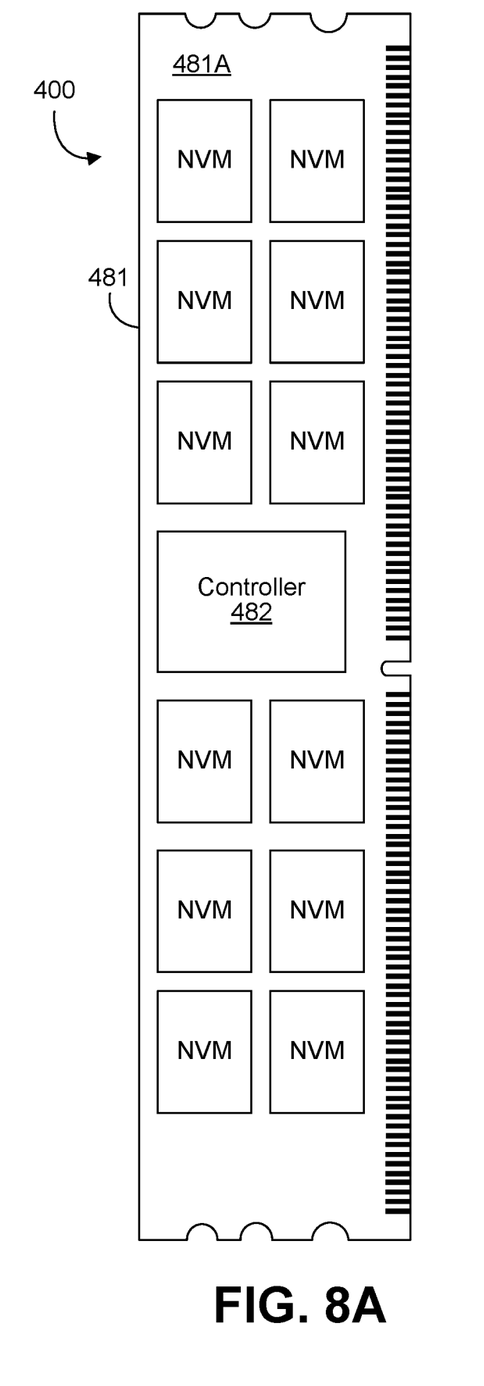
FIGS. 8A and 8B are illustrative top and bottom views of another example of a SSD according to an embodiment.
Figure 8B:
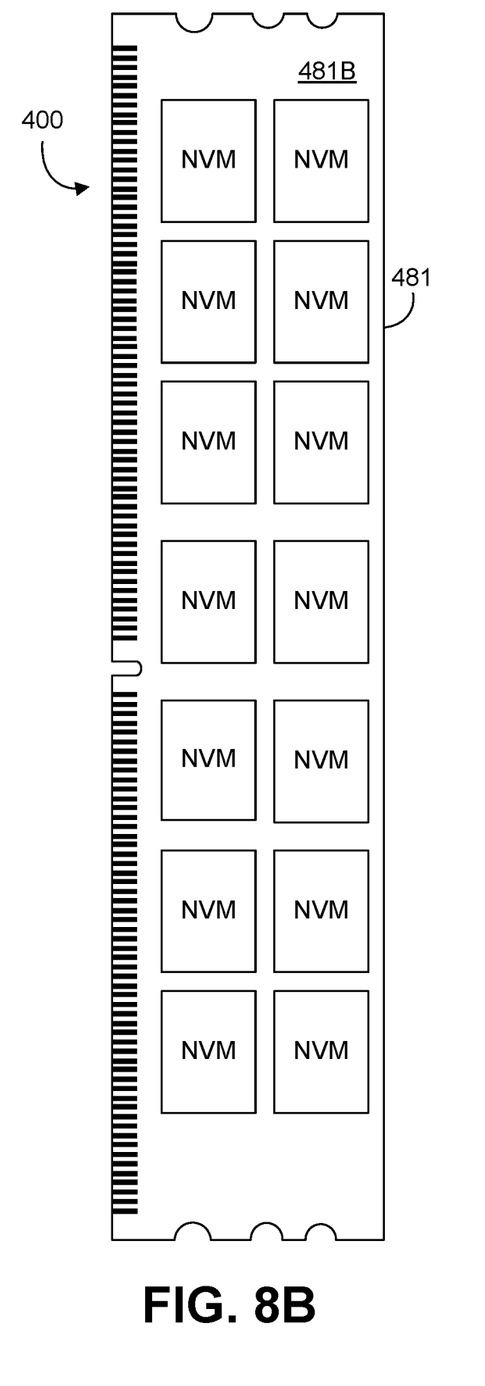

With reference to FIGS. 8A and 8B, an embodiment of a SSD 400 may include a PCB 481 with a DIMM form factor, including pins along both sides of a connector edge and components on both sides 481A and 481B of the DIMM. The number of pins shown in FIGS. 8A and 8B is for illustration purposes only, and more or fewer pins may be provided in various embodiments. The particular DIMM form factor shown in FIGS. 8A and 8B is for illustration purposes only, and other DIMM form factors may be provided in various embodiments. The SSD 400 may include additional components, circuitry, and logic to operate as a NVMe standards compliant SSD. For example, the SSD 400 may include, among other things, a controller 482 mounted on the PCB 481, interface component(s) including a communication interface, and a plurality of NVM devices mounted on the PCB 481. In accordance with some embodiments, the controller 482 includes technology for error correction and/or soft reads as described herein. For example, the NVM devices may include 3D crosspoint memory (e.g., INTEL OPTANE). The controller 482 may be configured to implement one or more aspects of the controller 11 (FIG. 1), the controller 18 (FIG. 2), the method 20 (FIGS. 3A to 3B), the low confidence zones (e.g., see FIG. 5), and/or any of the error correction and/or soft read features discussed herein.

ADDITIONAL NOTES AND EXAMPLES

Example 1 includes an electronic apparatus, comprising one or more substrates, and a controller coupled to the one or more substrates, the controller including circuitry to control access to a nonvolatile memory with a destructive read characteristic and memory cells programmed to a high resistance state that corresponds to a first threshold voltage and a low resistance state that correspond to a second threshold voltage, perform a first read of a codeword from the nonvolatile memory at a first reference voltage of a low confidence zone, wherein the low confidence zone is between the first and second threshold voltages, perform a second read of the codeword from the nonvolatile memory at a second reference voltage of the low confidence zone, wherein the second threshold voltage is different from the first reference voltage, and assign a lower confidence value to bits of the codeword that have a different value for the first read of the codeword and the second read of the codeword as compared to a confidence value assigned to bits of the codeword that have a same value for the first read of the codeword and the second read of the codeword.

Example 2 includes the apparatus of Example 1, wherein the circuitry is further to correct an error in the codeword based on the confidence values assigned to the bits of the codeword.

Example 3 includes the apparatus of any of Examples 1 to 2, wherein the circuitry is further to determine a preferred reference voltage for the first reference voltage of the low confidence zone, and determine a lower reference voltage relative to the preferred reference voltage for the second reference voltage of the low confidence zone.

Example 4 includes the apparatus of Example 3, wherein the circuitry is further to apply weights in an error code correction decoder based on the confidence values assigned to the bits of the codeword.

Example 5 includes the apparatus of Example 4, wherein the circuitry is further to apply more weight to bits of the codeword that correspond to the first, preferred reference voltage relative to bits of the codeword that correspond to the second, lower reference voltage.

Example 6 includes the apparatus of any of Examples 1 to 5, wherein the circuitry is further to assign a log-likelihood ratio (LLR) to the bits of the codeword based on the confidence values assigned to the bits of the codeword.

Example 7 includes the apparatus of Example 6, wherein the circuitry is further to assign a LLR of zero to the bits of the codeword assigned the lower confidence values.

Example 8 includes an electronic system, comprising nonvolatile memory with a destructive read characteristic and memory cells programmed to a high resistance state that corresponds to a first threshold voltage and a low resistance state that correspond to a second threshold voltage, and a controller communicatively coupled to the nonvolatile memory, the controller including circuitry to perform a first read of a codeword from the nonvolatile memory at a first reference voltage of a low confidence zone, wherein the low confidence zone is between the first and second threshold voltages, perform a second read of the codeword from the nonvolatile memory at a second reference voltage of the low confidence zone, wherein the second threshold voltage is different from the first reference voltage, and assign a lower confidence value to bits of the codeword that have a different value for the first read of the codeword and the second read of the codeword as compared to a confidence value assigned to bits of the codeword that have a same value for the first read of the codeword and the second read of the codeword.

Example 9 includes the system of Example 8, wherein the circuitry is further to correct an error in the codeword based on the confidence values assigned to the bits of the codeword.

Example 10 includes the system of any of Examples 8 to 9, wherein the circuitry is further to determine a preferred reference voltage for the first reference voltage of the low confidence zone, and determine a lower reference voltage relative to the preferred reference voltage for the second reference voltage of the low confidence zone.

Example 11 includes the system of Example 10, wherein the circuitry is further to apply weights in an error code correction decoder based on the confidence values assigned to the bits of the codeword.

Example 12 includes the system of Example 11, wherein the circuitry is further to apply more weight to bits of the codeword that correspond to the first, preferred reference voltage relative to bits of the codeword that correspond to the second, lower reference voltage.

Example 13 includes the system of any of Examples 8 to 12, wherein the circuitry is further to assign a log-likelihood ratio (LLR) to the bits of the codeword based on the confidence values assigned to the bits of the codeword.

Example 14 includes the system of Example 13, wherein the circuitry is further to assign a LLR of zero to the bits of the codeword assigned the lower confidence values.

Example 15 includes a method, comprising controlling access to a nonvolatile memory with a destructive read characteristic and memory cells programmed to a high resistance state that corresponds to a first threshold voltage and a low resistance state that correspond to a second threshold voltage, performing a first read of a codeword from the nonvolatile memory at a first reference voltage of a low confidence zone, wherein the low confidence zone is between the first and second threshold voltages, performing a second read of the codeword from the nonvolatile memory at a second reference voltage of the low confidence zone, wherein the second threshold voltage is different from the first reference voltage, and assigning a lower confidence value to bits of the codeword that have a different value for the first read of the codeword and the second read of the codeword as compared to a confidence value assigned to bits of the codeword that have a same value for the first read of the codeword and the second read of the codeword.

Example 16 includes the method of Example 15, further comprising correcting an error in the codeword based on the confidence values assigned to the bits of the codeword.

Example 17 includes the method of any of Examples 15 to 16, further comprising determining a preferred reference voltage for the first reference voltage of the low confidence zone, and determining a lower reference voltage relative to the preferred reference voltage for the second reference voltage of the low confidence zone.

Example 18 includes the method of Example 17, further comprising applying weights in an error code correction decoder based on the confidence values assigned to the bits of the codeword.

Example 19 includes the method of Example 18, further comprising applying more weight to bits of the codeword that correspond to the first, preferred reference voltage relative to bits of the codeword that correspond to the second, lower reference voltage.

Example 20 includes the method of any of Examples 15 to 19, further comprising assigning a log-likelihood ratio (LLR) to the bits of the codeword based on the confidence values assigned to the bits of the codeword.

Example 21 includes the method of Example 20, further comprising assigning a LLR of zero to the bits of the codeword assigned the lower confidence values.

Example 22 includes at least one non-transitory one machine readable medium comprising a plurality of instructions that, in response to being executed on a computing device, cause the computing device to control access to a nonvolatile memory with a destructive read characteristic and memory cells programmed to a high resistance state that corresponds to a first threshold voltage and a low resistance state that correspond to a second threshold voltage, perform a first read of a codeword from the nonvolatile memory at a first reference voltage of a low confidence zone, wherein the low confidence zone is between the first and second threshold voltages, perform a second read of the codeword from the nonvolatile memory at a second reference voltage of the low confidence zone, wherein the second threshold voltage is different from the first reference voltage, and assign a lower confidence value to bits of the codeword that have a different value for the first read of the codeword and the second read of the codeword as compared to a confidence value assigned to bits of the codeword that have a same value for the first read of the codeword and the second read of the codeword.

Example 23 includes the at least one non-transitory one machine readable medium of Example 22, comprising a plurality of further instructions that, in response to being executed on the computing device, cause the computing device to correct an error in the codeword based on the confidence values assigned to the bits of the codeword.

Example 24 includes the at least one non-transitory one machine readable medium of any of Examples 22 to 23, wherein the first application corresponds to a virtual machine, comprising a plurality of further instructions that, in response to being executed on the computing device, cause the computing device to determine a preferred reference voltage for the first reference voltage of the low confidence zone, and determine a lower reference voltage relative to the preferred reference voltage for the second reference voltage of the low confidence zone.

Example 25 includes the at least one non-transitory one machine readable medium of Example 24, comprising a plurality of further instructions that, in response to being executed on the computing device, cause the computing device to apply weights in an error code correction decoder based on the confidence values assigned to the bits of the codeword.

Example 26 includes the at least one non-transitory one machine readable medium of Example 25, comprising a plurality of further instructions that, in response to being executed on the computing device, cause the computing device to apply more weight to bits of the codeword that correspond to the first, preferred reference voltage relative to bits of the codeword that correspond to the second, lower reference voltage.

Example 27 includes the at least one non-transitory one machine readable medium of any of Examples 22 to 26, wherein the first application corresponds to a virtual machine, comprising a plurality of further instructions that, in response to being executed on the computing device, cause the computing device to assign a log-likelihood ratio (LLR) to the bits of the codeword based on the confidence values assigned to the bits of the codeword.

Example 28 includes the at least one non-transitory one machine readable medium of Example 27, comprising a plurality of further instructions that, in response to being executed on the computing device, cause the computing device to assign a LLR of zero to the bits of the codeword assigned the lower confidence values.

Example 29 includes an apparatus, comprising means for controlling access to a nonvolatile memory with a destructive read characteristic and memory cells programmed to a high resistance state that corresponds to a first threshold voltage and a low resistance state that correspond to a second threshold voltage, means for performing a first read of a codeword from the nonvolatile memory at a first reference voltage of a low confidence zone, wherein the low confidence zone is between the first and second threshold voltages, means for performing a second read of the codeword from the nonvolatile memory at a second reference voltage of the low confidence zone, wherein the second threshold voltage is different from the first reference voltage, and means for assigning a lower confidence value to bits of the codeword that have a different value for the first read of the codeword and the second read of the codeword as compared to a confidence value assigned to bits of the codeword that have a same value for the first read of the codeword and the second read of the codeword.

Example 30 includes the apparatus of Example 29, further comprising means for correcting an error in the codeword based on the confidence values assigned to the bits of the codeword.

Example 31 includes the apparatus of any of Examples 29 to 30, further comprising means for determining a preferred reference voltage for the first reference voltage of the low confidence zone, and means for determining a lower reference voltage relative to the preferred reference voltage for the second reference voltage of the low confidence zone.

Example 32 includes the apparatus of Example 31, further comprising means for applying weights in an error code correction decoder based on the confidence values assigned to the bits of the codeword.

Example 33 includes the apparatus of Example 32, further comprising means for applying more weight to bits of the codeword that correspond to the first, preferred reference voltage relative to bits of the codeword that correspond to the second, lower reference voltage.

Example 34 includes the apparatus of any of Examples 29 to 33, further comprising means for assigning a log-likelihood ratio (LLR) to the bits of the codeword based on the confidence values assigned to the bits of the codeword.

Example 35 includes the apparatus of Example 34, further comprising means for assigning a LLR of zero to the bits of the codeword assigned the lower confidence values.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
a controller coupled to the one or more substrates, the controller including circuitry to:
control access to a nonvolatile memory with a destructive read characteristic and memory cells programmed to a high resistance state that corresponds to a first threshold voltage and a low resistance state that correspond to a second threshold voltage;
perform a first read of a codeword from the nonvolatile memory at a first reference voltage of a low confidence zone, wherein the low confidence zone is between the first and second threshold voltages;
perform a second read of the codeword from the nonvolatile memory at a second reference voltage of the low confidence zone, wherein the second threshold voltage is lower than the first reference voltage;
assign a first confidence value to first bits of the codeword based on a determination that the first bits have a different value for the first read of the codeword and the second read of the codeword, wherein the first confidence value is to be lower than a second confidence value which is to be assigned to second bits of the codeword that have a same value for the first read of the codeword and the second read of the codeword; and
apply weights in an error code correction decoder based on the first confidence value and the second confidence value, wherein the circuitry is to apply a first weight to bits of the codeword that correspond to the first reference voltage, and wherein the first weight is greater than a second weight which is to be applied to bits of the codeword that correspond to the second reference voltage.

2. The electronic apparatus of claim 1, wherein the circuitry is further to:
correct an error in the codeword based on the first confidence value and the second confidence value.

3. The electronic apparatus of claim 1, wherein the circuitry is further to:

determine respective levels of the first reference voltage and the second reference voltage.

4. The electronic apparatus of claim 3, wherein the circuitry is further to:
assign a log-likelihood ratio (LLR) value to one or more bits of the codeword based on one of the first confidence value or the second confidence value.

5. The electronic apparatus of claim 4, wherein the circuitry is to:
assign a LLR value of zero to the first bits.

6. An electronic system, comprising:
nonvolatile memory with a destructive read characteristic and memory cells programmed to a high resistance state that corresponds to a first threshold voltage and a low resistance state that correspond to a second threshold voltage; and
a controller communicatively coupled to the nonvolatile memory, the controller including circuitry to:
perform a first read of a codeword from the nonvolatile memory at a first reference voltage of a low confidence zone, wherein the low confidence zone is between the first and second threshold voltages;
perform a second read of the codeword from the nonvolatile memory at a second reference voltage of the low confidence zone, wherein the second threshold voltage is lower than the first reference voltage;
assign a first confidence value to first bits of the codeword based on a determination that the first bits have a different value for the first read of the codeword and the second read of the codeword, wherein the first confidence value is to be lower than a second confidence value which is to be assigned to second bits of the codeword that have a same value for the first read of the codeword and the second read of the codeword; and
apply weights in an error code correction decoder based on the first confidence value and the second confidence value, wherein the circuitry is to apply a first weight to bits of the codeword that correspond to the first reference voltage, and wherein the first weight is greater than a second weight which is to be applied to bits of the codeword that correspond to the second reference voltage.

7. The electronic system of claim 6, wherein the circuitry is further to:
correct an error in the codeword based on the first confidence value and the second confidence value.

8. The electronic system of claim 6, wherein the circuitry is further to:
determine respective levels of the first reference voltage and the second reference voltage.

9. The electronic system of claim 8, wherein the circuitry is further to:
assign a log-likelihood ratio (LLR) value to one or more bits of the codeword based on one of the first confidence value or the second confidence value.

10. The electronic system of claim 9, wherein the circuitry is further to:
assign a LLR value of zero to the first bits.

11. A method, comprising:
controlling access to a nonvolatile memory with a destructive read characteristic and memory cells programmed to a high resistance state that corresponds to a first threshold voltage and a low resistance state that correspond to a second threshold voltage;
performing a first read of a codeword from the nonvolatile memory at a first reference voltage of a low confidence zone, wherein the low confidence zone is between the first and second threshold voltages;
performing a second read of the codeword from the nonvolatile memory at a second reference voltage of the low confidence zone, wherein the second threshold voltage is lower than the first reference voltage;
assigning a first confidence value to first bits of the codeword based on a determination that the first bits have a different value for the first read of the codeword and the second read of the codeword, wherein the first confidence value is lower than a second confidence value assigned to second bits of the codeword that have a same value for the first read of the codeword and the second read of the codeword; and
applying weights in an error code correction decoder based on the first confidence value and the second confidence value, comprising applying a first weight to bits of the codeword that correspond to the first reference voltage, and wherein the first weight is greater than a second weight which is to be applied to bits of the codeword that correspond to the second reference voltage.

12. The method of claim 11, further comprising:
correcting an error in the codeword based on the first confidence value and the second confidence value.

13. The method of claim 11, further comprising:
determining respective levels of the first reference voltage and the second reference voltage.

14. The method of claim 13, further comprising:
assigning a log-likelihood ratio (LLR) value to one or more bits of the codeword based on one of the first confidence value or the second confidence value.

* * * * *